United States Patent [19]

Berggren

[11] 4,202,579
[45] May 13, 1980

[54] CAMPER SHELL STRUCTURE

[76] Inventor: Donald R. Berggren, 2717 Arlene Ct., Simi Valley, Calif. 93065

[21] Appl. No.: 927,170

[22] Filed: Jul. 21, 1978

[51] Int. Cl.² .............................................. B60P 3/32
[52] U.S. Cl. .................................... 296/156; 280/756; 296/102
[58] Field of Search ............. 296/10, 100, 102, 23 R, 296/28 C, 137 R; 280/756

[56] References Cited

U.S. PATENT DOCUMENTS

| | | | |
|---|---|---|---|
| D. 183,169 | 7/1958 | Hess | 296/102 |
| 3,390,913 | 7/1968 | Hunter | 296/10 |
| 3,450,430 | 6/1969 | Wendt | 296/28 C |
| 3,524,674 | 8/1970 | Medeiros | 296/102 |
| 3,599,813 | 8/1971 | Totz | 280/756 |
| 3,897,100 | 7/1975 | Gardner | 296/100 |

*Primary Examiner*—John J. Love
*Assistant Examiner*—John A. Carroll
*Attorney, Agent, or Firm*—Jack C. Munro

[57] ABSTRACT

In combination with a land vehicle such as a pick-up truck in which the bed portion of the truck is to optionally include a camper shell. Attached to the truck body is a roll bar assembly which is located within the load carrying bed of the truck directly adjacent the cab of the truck. The portion of the camper shell located directly adjacent the cab of the truck to be recessed in order to accommodate the roll bar assembly.

2 Claims, 3 Drawing Figures

CAMPER SHELL STRUCTURE

BACKGROUND OF THE INVENTION

The field of this invention relates to vehicles and more particularly to a pick-up truck type of vehicle which has a specifically designed camper shell placeable upon the bed of the truck configured specifically to accommodate the roll bar assembly of a truck.

Pick-up trucks are in common use at the present time in the manner of a recreational vehicle. The bed portion of the pick-up truck may be optionally closed by means of a shell which has been commonly termed a camper shell. This camper shell will normally include a plurality of windows and the back wall of the shell can be removed or hingedly moved with respect to the remaining portion of the shell in order to facilitate entry into the enclosed area between the camper shell and the bed of the truck.

It is most common with such trucks to include some type of roll bar assembly. The most logical location for the roll bar assembly is directly aft the cab of the truck and located within the bed portion of the truck. This roll bar assembly, for purposes of appearance, generally follows the design of the truck in that the roll bar assembly extends in a direction upwardly about the height of the cab of the truck and in width is about equal to the width of the truck. Such roll bar assemblies are for the obvious reasons of safety in the event that the vehicle is overturned.

The conventional camper shells are constructed with completely planar side walls and top wall forming an essentially box-like configuration. Such a camper shell cannot be placed upon a truck bed that has a roll bar assembly as the roll bar assembly will interfere with the positioning of the camper shell upon the truck bed which must be obtained prior to securing of the camper shell to the truck bed.

There is a definite need for constructing a camper shell which is to be employed in connection with the bed of a pick-up truck and which is constructed to accommodate a roll bar assembly.

SUMMARY OF THE INVENTION

The structure of this invention is believed to be summarily described in the Abstract of the Disclosure and reference is to be had thereto.

The primary objective of this invention is to construct a camper shell which is to be located in the bed of a pick-up truck with a roll bar assembly being located exteriorly of the forwardmost portion of the camper shell.

DETAILED DESCRIPTION OF THE SHOWN EMBODIMENT

Figure 1:
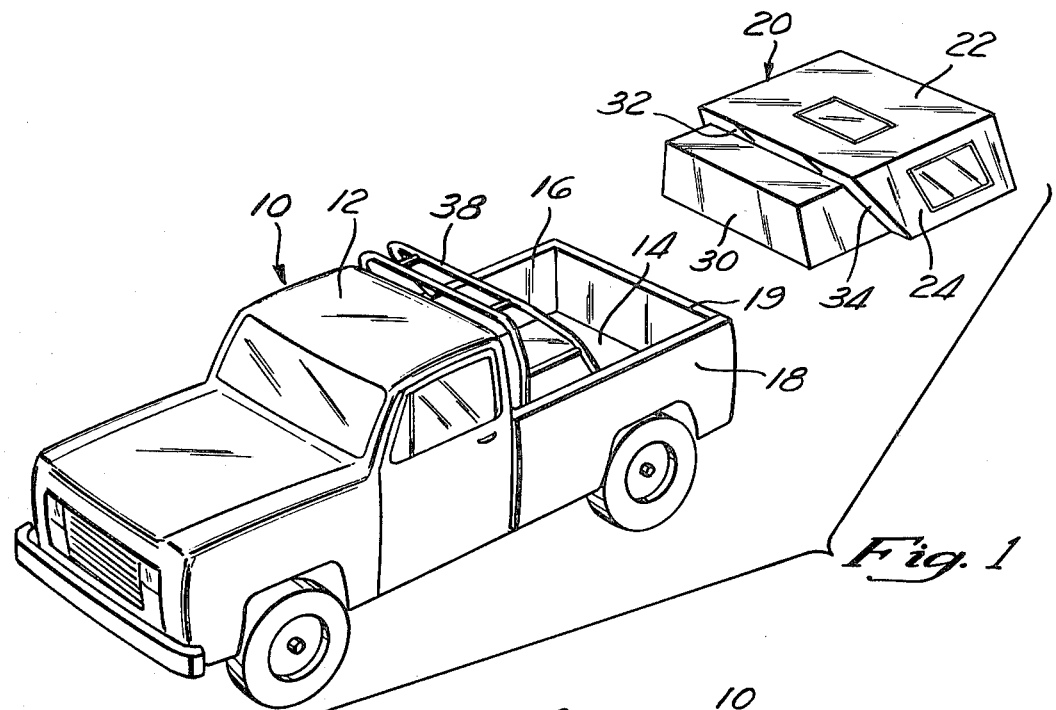
FIG. 1 is an exploded isometric view of a pick-up truck land vehicle with the type of camper shell of this invention shown displaced from the truck bed.
Figure 2:
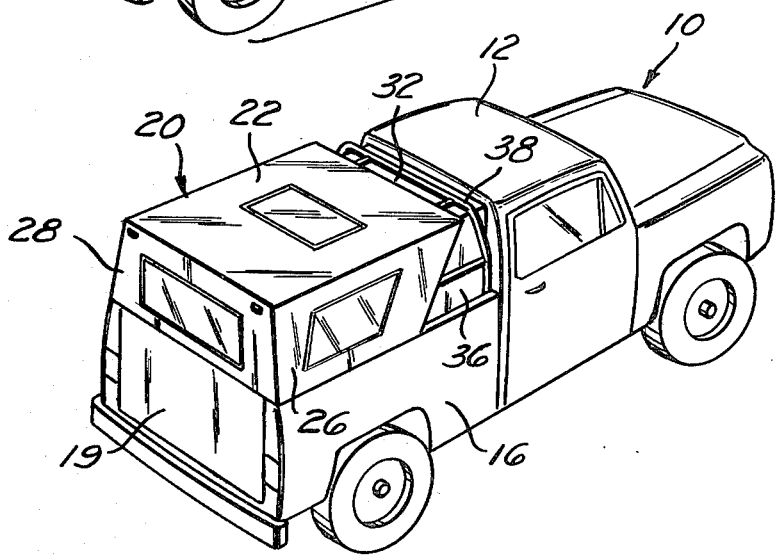
FIG. 2 is a rear isometric view of the pick-up truck with the camper shell of this invention mounted on the bed of the truck.
Figure 3:
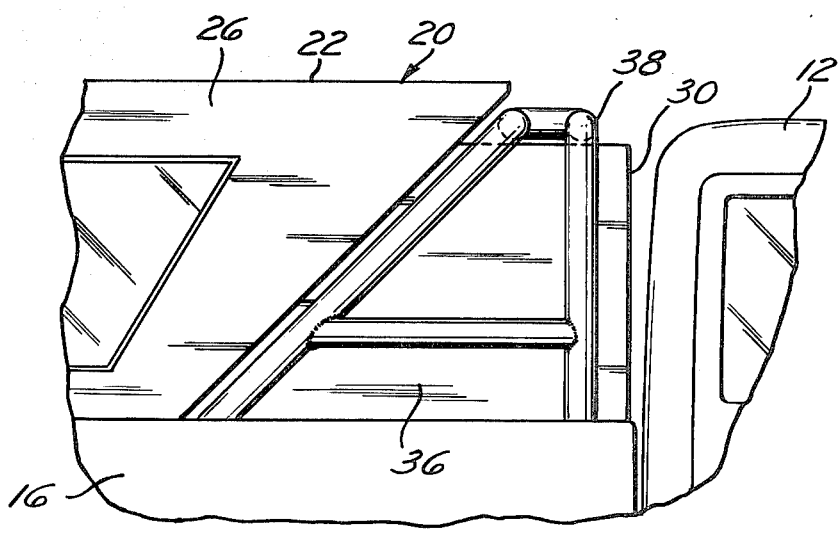
FIG. 3 is a right side view of the recessed forward area of the camper shell of this invention.

Referring particularly to the drawing there is shown in FIG. 1 a conventional pick-up truck 10 which has a cab section 12 and a load carrying section comprising a planar bed 14 which has upstanding vertical side walls 16 and 18. The load carrying section is to be closed at the back by means of the gate 19 which is pivotly attached to the bed 14.

The camper shell 20 of this invention has a top 22 to which are connected on each side thereof side walls 24 and 26. The side walls 24 and 26 are connected in the rear by means of a back wall 28 and in the front by means of a front wall 30. The back wall 28 is normally made to be hingedly connected to the top 22 in order to facilitate entry into the enclosed area between the camper shell 20 and the truck bed 14. It is to be understood that the camper shell 20 when placed upon the side walls 16 and 18 will be latched thereto. It is also to be understood that the side wall 26 will be located in substantially planar alignment with the side wall 16 with the side wall 18 being located substantially in planar alignment with the side wall 24.

The portion of the top 22 with the camper shell 20 located directly adjacent the cab section 12 of the truck 10 includes a recessed area 32. The side wall section 24 adjacent the cab 12 also includes a recessed area 34. Similarly the side wall 26 located adjacent the cab 12 includes a recessed area 36. Basically the shape of the recessed areas 34 and 36 is triangular with the recessed area 32 being substantially rectangular. However, the precise shape of each of these areas is deemed to be a matter of choice of design.

Secured to the side walls 16 and 18 of the truck adjacent the cab section 12 is a roll bar assembly 38. The roll bar assembly 38 includes a pair of spaced apart bar members with interconnecting brace members. The structure of the roll bar assembly 38 is deemed to be conventional and forms no specific part of this invention.

With the camper shell 20 placed upon the truck 10 over the bed 14, the recessed areas 32, 34 and 36 cooperate so as to accommodate the roll bar assembly 38. The camper shell 20 can then be securely latched to the side walls 16 and 18. If per chance the truck 10 were overturned, the roll bar assembly 38 will function in the normal manner. Because of the recessing of the camper shell 20, the truck 10 of this invention can include a camper shell which was previously not possible if the truck 10 included a roll bar assembly 38.

What is claimed is:

1. In combination with a land vehicle, said land vehicle having a cab section and a load carrying section located aft of said cab section, said load carrying section comprising a planar horizontal bed having raised vertical side walls, a roll bar assembly attached to said vehicle and located within said load carrying section and directly adjacent said cab section, a camper shell located within said load carrying section, the improvement comprising:

said camper shell having a top, a front wall, a back wall and side walls, the major part of each said side wall of said camper shell being located substantially in the same plane as the respective said raised vertical side wall of said load carrying section, a portion of each said side wall of said camper shell being inwardly recessed in the area directly adjacent said front wall, said roll bar assembly located within said recessed area.

2. The combination defined in claim 1 wherein:

a portion of said top being also inwardly recessed in the area directly adjacent said front wall, said roll bar assembly located within said recessed area of said top.

* * * * *